No. 880,892. PATENTED MAR. 3, 1908.
F. A. LEBKUECHER.
HINGE.
APPLICATION FILED MAY 23, 1907.
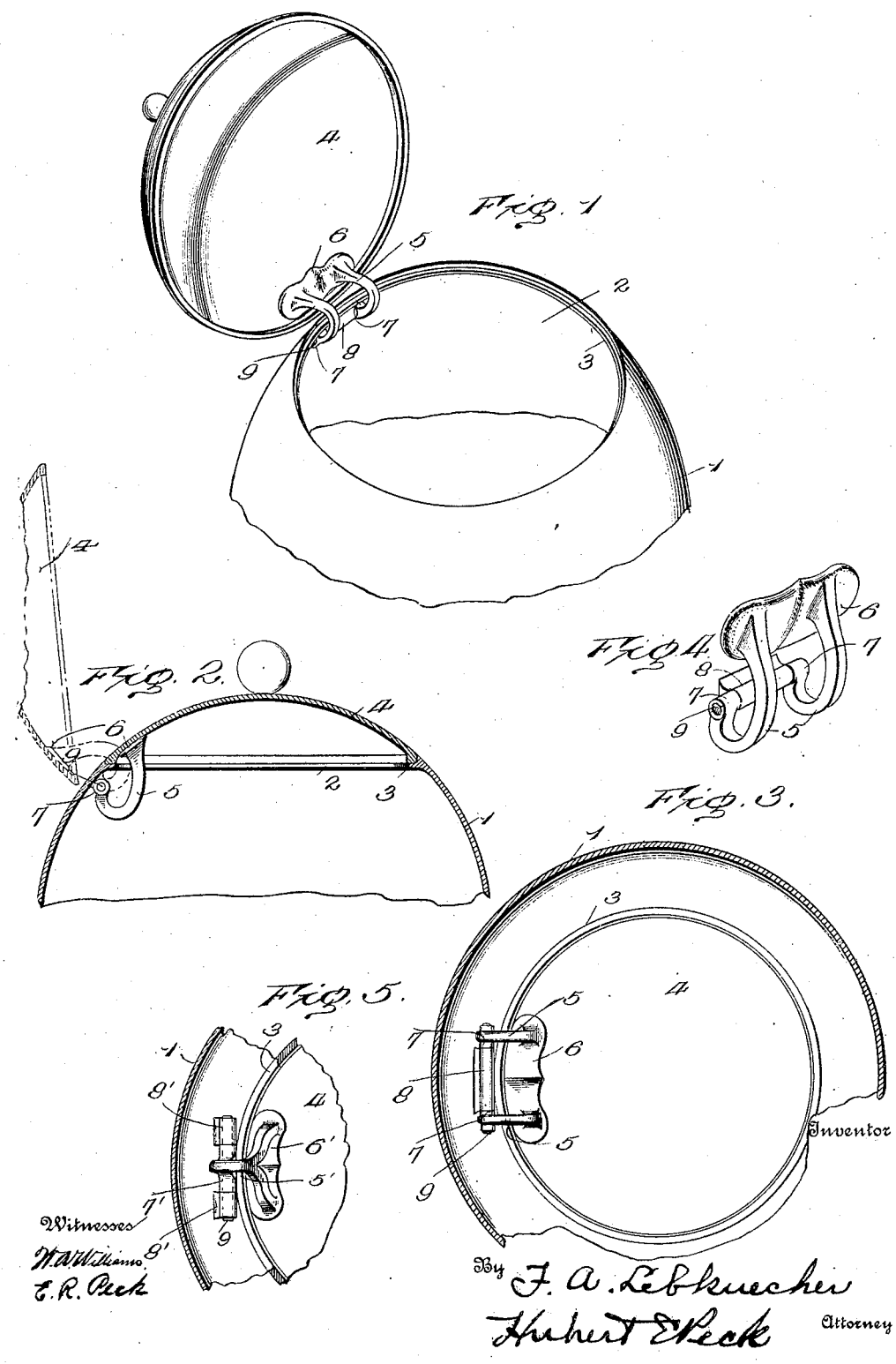
Witnesses
W. A. Williams
E. R. Peck
Inventor
F. A. Lebkuecher
By Hubert E. Peck
Attorney

UNITED STATES PATENT OFFICE.

FRANK A. LEBKUECHER, OF NEWARK, NEW JERSEY.

HINGE.

No. 880,892.  Specification of Letters Patent.  Patented March 3, 1908.

Application filed May 23, 1907. Serial No. 375,327.

*To all whom it may concern:*

Be it known that I, FRANK A. LEBKUE-CHER, a citizen of the United States, residing at Newark, Essex county, New Jersey, have invented certain new and useful Improvements in Hinges; and I do hereby declare the following to be a full, clear, and exact description of the invention, such as will enable others skilled in the art to which it appertains to make and use the same.

This invention relates to certain improvements in hinges, and more particularly relates to improvements in concealed or invisible hinge connections or joints for the lids or covers of vessels for table, kitchen or other uses, or for general application wherever such hinges could be employed to advantage.

An object of the invention is to provide a comparatively simple hinge joint or connection so constructed or arranged as to be concealed or invisible when the lid or cover is in closed or lowered position, and which when the cover or lid is opened permits the cover to move upwardly and outwardly entirely free of the vessel or other receptacle and from the opening thereinto, and which will support and uphold the cover in opened position a distance to one side of said opening with the hinge extending to the cover from a point within the vessel and below the opening which the cover is adapted to close.

A further object of the invention is to produce improvements in hinges whereby an invisible or concealed hinge will be provided simple and strong in structure and adapted to be attached to the under side of a lid, cover or the like and depend therefrom into the vessel or receptacle and be pivotally joined to the inner surface thereof a distance below the top edge or opening thereof, whereby the hinge will support the lid or cover in opened position and uphold the same from contact with the walls of the vessel and a distance to one side of the opening thereinto.

The invention consists in certain novel features in construction and in arrangements and combinations of parts as more fully and particularly set forth hereinafter.

Referring to the accompanying drawings: Figure 1, is a perspective view of the upper portion of a coffee or teapot or the like showing the lid or cover in open position and connected to the body of the vessel by a hinge construction within the spirit and scope of my invention. Fig. 2, is a vertical section through the vessel of Fig. 1, showing the cover in closed position. Fig. 3, is a horizontal section through the vessel, the cover being shown in closed position. Fig. 4, is a detail view of the hinge detached. Fig. 5, is a detail horizontal section showing portions of the vessel and cover, the cover being in closed position, and illustrating a modified form of hinge construction of my invention.

In the drawings, I show my improved hinge applied to a coffee or tea pot, but wish it understood that my said invention can be applied to kitchen or table vessels or utensils, and to connect the covers to various receptacles or wherever such a hinge can be used to advantage.

In the drawings, 1, is the body of a vessel, such as a metal coffee or tea pot, or the like, having a top opening 2, formed with an annular internal or depressed edge or shoulder 3, on which the cover or lid 4, is adapted to seat when fitting down in and closing the opening with the edge and top surface of the cover flush, if so desired, with the outer surface of the vessel and the edge thereof around said opening, as indicated more particularly by Fig. 2, of the drawings.

The hinge consists of one or more rigid or stiff arms 5, rigidly secured to and depending from the under side of the cover and extending into the vessel through the opening 2, thereof, with each arm at its lower or inner end deflected laterally and pivotally joined to the inner wall of the vessel at a point below said opening and below the edge 3, surrounding the same.

In the preferred form, I employ a pair of spaced parallel similar arms 5, at their upper ends depending from a base plate 6, rigidly secured in any suitable manner to the under side of the cover. If so desired, I can solder or braze this flat base 6, to the under surface of the cover, and I usually cast or otherwise form the base and arms in one piece of suitable metal. The base is secured flat against the under face of the cover within the edge thereof but adjacent to the edge so that the arms extend inwardly or downwardly about perpendicularly from an intermediate portion thereof that is from a point within the cover edge and preferably removed a short distance from the nearest portion of said edge. The inner or lower portions of said arms are bent or curved laterally toward the adjacent inner surface of the vessel. In other words, each arm 5, is approximately J-shaped and at its inner end is formed with a transverse eye 7. Where two arms are employed the eyes 7, thereof are alined, and are preferably arranged at the opposite ends of a transverse post 8, rigidly secured by solder, brazing or in any approved manner to the inner surface of the vessel wall and are pivotally joined thereto by a pivot or hinge pin 9, passed through the post and eyes of the arms so that the eyes will turn or oscillate on a transverse axis as the cover swings. The post 8, is arranged within the vessel below the top opening thereof and usually to one side of said top opening where the opening is contracted so that the vessel has an overhanging top wall as shown in the drawings.

In Fig. 5, I show the hinge connection formed by a single bent, angular or J-shaped arm 5', rigid with its base 6', secured to the under face of the cover, and formed with a laterally enlarged eye 7', at its inner end fitted between two posts 8', rigidly secured to the inner surface of the vessel wall and joined thereto by a transverse pivot pin to form the axis on which the arm rocks or oscillates.

One or more arms can be employed secured to the cover, and the inner end or ends of the arm or arms can be pivotally joined through one or more posts to the interior of the vessel, receptacle or the like.

The arm or arms form the sole connection between the cover and vessel, and when the cover is elevated it swings from a center located a distance below the horizontal plane of the vessel opening and to one side of the vertical line of said opening, and hence the cover lifts entirely clear of the vessel top and when the cover assumes the vertical or completely opened position its lower edge is located some distance to one side of the vessel opening and the cover is thus upheld by the arms a distance above the vessel and out of contact therewith, although I do not wish to so limit all features of my invention.

When the cover is in opened position, the main or outer portions of the arms are about horizontal while their inner ends extend downwardly through the open top of the vessel and inwardly into the vessel and to the pivoted connection with the wall thereof. The cover is thus upheld by the engagement of the curved portions of the arms with the edge of the vessel around the top opening thereof.

It is evident that various changes and modifications might be resorted to without departing from the spirit and scope of my invention and hence I do not wish to limit myself to the exact constructions shown.

What I claim is:—

1. A domestic vessel at its top contracting upwardly to a top opening and formed with an annular seat in its edge around said opening, a vertically swinging lid adapted to fit down into said opening onto said seat, an approximately J-shaped arm at the upper end of its elongated portion rigidly fixed to the under side of said lid within the edge boundary thereof and depending from said lid through said opening, and means pivotally joining the end of the short curved inner portion of said arm to the under surface of the vessel top to swing on a transverse axis at one side of said opening and below the horizontal plane thereof, said arm constructed, arranged and pivoted to engage at its curved inner portion within said opening, the edge of the wall surrounding said opening when the lid is in completely opened position and thereby bodily uphold and support said lid laterally beyond said opening and spaced from the vessel top, substantially as described.

2. A vessel having a top opening, a vertically and laterally swingable lid to close said opening, a plate 6, rigidly fixed to the under surface of said lid adjacent the edge thereof and formed with a pair of spaced, parallel similar approximately J-shaped arms 5, depending therefrom and rigid therewith, a post 8, rigidly fixed to the under surface of the vessel top adjacent said opening, and a transverse axis by which the inner ends of said arms are pivotally joined to said post, said arms being constructed and arranged to engage at their intermediate portions and at spaced points along the vessel top edge within said opening when the cover is completely opened to hold said cover bodily to one side of and beyond said opening and spaced from the top of the vessel, substantially as described.

In testimony whereof I affix my signature, in presence of two witnesses.

FRANK A. LEBKUECHER.

Witnesses:
CHARLES C. WIENTGE,
LOUIS F. WENTZEL.